(12) United States Patent
Nakagawa et al.

(10) Patent No.: US 7,789,336 B1
(45) Date of Patent: Sep. 7, 2010

(54) SPOOL FOR DUAL-BEARING REEL

(75) Inventors: Shouji Nakagawa, Sakai (JP); Akira Niitsuma, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/717,925

(22) Filed: Mar. 4, 2010

(30) Foreign Application Priority Data

Apr. 28, 2009 (JP) .............................. 2009-108697

(51) Int. Cl.
   *A01K 89/01* (2006.01)
(52) U.S. Cl. ....................................... 242/322; 242/317
(58) Field of Classification Search ................. 242/322, 242/317
   See application file for complete search history.

(56) References Cited

U.S. PATENT DOCUMENTS

| | | | | |
|---|---|---|---|---|
| 1,855,738 A | * | 4/1932 | Case | 242/322 |
| 2,457,323 A | * | 12/1948 | Sharps | 242/306 |
| 2,669,399 A | * | 2/1954 | Wood | 242/323 |
| 2,669,400 A | * | 2/1954 | Wood | 242/323 |
| 4,733,830 A | * | 3/1988 | Hollander | 242/292 |
| 4,746,079 A | * | 5/1988 | Newell | 242/129.7 |
| 4,771,964 A | * | 9/1988 | Watanabe et al. | 242/250 |
| 5,507,443 A | * | 4/1996 | Miyazaki | 242/322 |
| 5,855,332 A | * | 1/1999 | Stiner | 242/322 |
| 5,875,986 A | * | 3/1999 | Miyazaki et al. | 242/261 |
| 6,851,638 B2 | * | 2/2005 | Maeda et al. | 242/321 |
| 7,097,124 B2 | * | 8/2006 | Ikuta et al. | 242/322 |

FOREIGN PATENT DOCUMENTS

JP    2001-145445 A    5/2001

* cited by examiner

*Primary Examiner*—Emmanuel M Marcelo
(74) *Attorney, Agent, or Firm*—Shinjyu Global IP

(57) ABSTRACT

A spool includes a tubular bobbin trunk, a pair of flanges and a boss member. The bobbin trunk has a peripheral surface extending along the axial direction of the spool so that a fishing line can be wound around the bobbin truck. The peripheral surface of the bobbin trunk includes thickened wall portions disposed on opposing sides of an axial center part of the bobbin trunk. The flanges are integrally formed with the peripheral surface of the bobbin trunk as a one-piece, unitary member. Each of the flanges extends substantially in a radially outward direction of the spool. The boss member is disposed between axial ends of the bobbin trunk and extends along the radial direction of the spool. The boss member includes a disc portion with a through-hole to receive a spool shaft. Each of the thickened wall portions has a thickness greater than other portions of the bobbin trunk.

7 Claims, 8 Drawing Sheets

SPOOL FOR DUAL-BEARING REEL

CROSS-REFERENCE TO RELATED APPLICATIONS

This application claims priority under 35 U.S.C. §119 to Japanese Patent Application No. 2009-108697 filed on Apr. 28, 2009. The entire disclosure of Japanese Patent Application No. 2009-108697 is hereby incorporated herein by reference.

BACKGROUND OF THE INVENTION

1. Field of the Invention

The present invention relates to a spool for a dual-bearing reel. More specifically, the present invention relates to a spool for a dual-bearing reel that is attached to a spool shaft supported by a reel body.

2. Background Information

The dual-bearing reel generally includes a reel body and a spool. The reel body has a handle, whereas the spool is rotatably attached to the reel body. The spool includes a bobbin trunk and flanges. A fishing line is wound around the outer periphery of the bobbin trunk. The flanges are provided on the axial both ends of the bobbin trunk. The bobbin trunk includes a cylindrical portion and a boss. A fishing line is wound around the outer periphery of the cylindrical portion. The boss is formed in the inner peripheral side of the cylindrical portion. The bobbin trunk is attached onto a spool shaft through the boss. The respective flanges protrude from the axial both ends of the bobbin trunk in a radial-outward direction. Diameter of the respective flanges is greater than that of the bobbin trunk. The respective flanges slant for gradually extending their diameter in an axial-outward direction. For example, Laid-Open Japan Patent Publication No. JP-A-2001-145445 discloses the configuration.

With some spools of the aforementioned type, it is feasible to include a bobbin trunk made of a light thin metal plate. The particular configuration achieves reduction of the entire spool weight and inertia force. Accordingly, rotation performance of the spool is enhanced. Thickness of the bobbin trunk is herein reduced by employing light metal (e.g., aluminum/magnesium alloy). When further reduction in thickness of the bobbin trunk is desired, however, the following drawback is produced. When the flanges are cut or the fishing line is wound around the spool, large stress acts especially on intermediate portions between the flanges and the axial center of the bobbin trunk. Accordingly, regions from the flanges to the axial center of the bobbin trunk may bend in the axial-outward direction. When the flanges thus bend in the axial-outward direction, a clearance is produced between the flanges and the reel body. The fishing line may get stuck in the clearance.

It will be apparent to those skilled in the art from this disclosure that there exists a need for an improved spool. This invention addresses this need in the art as well as other needs, which will become apparent to those skilled in the art from this disclosure.

SUMMARY OF THE INVENTION

Aspects of the invention have been created to solve the above-mentioned problems occurring in the conventional practice and to prevent deformation of a spool used in a dual-bearing reel without compromising the performance of the spool.

In accordance with one aspect of the invention, a spool for a dual-bearing reel is attached to a spool shaft supported by a reel body. The spool comprises a tubular bobbin trunk with a peripheral surface extending along the axial direction of the spool so that a fishing line can be wound around the bobbin truck. The peripheral surface includes thickened wall portions disposed on opposing sides of an axial center part of the bobbin trunk. A pair of flanges is integrally formed with the peripheral surface of the bobbin trunk as a one-piece, unitary member. Each of the flanges extends substantially in a radially outward direction of the spool. A boss member is disposed between axial ends of the bobbin trunk and extends along the radial direction of the spool. The boss member includes a disc portion with a through-hole to receive the spool shaft. Each of the thickened wall portions has a thickness greater than the thickness of other portions of the bobbin trunk.

These and other features, aspects and advantages of the present invention will become apparent to those skilled in the art from the following detailed description, which, taken in conjunction with the annexed drawings, discloses embodiments of the present invention.

BRIEF DESCRIPTION OF THE DRAWINGS

Referring now to the attached drawings which form a part of this original disclosure.

DETAILED DESCRIPTION OF THE ILLUSTRATED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
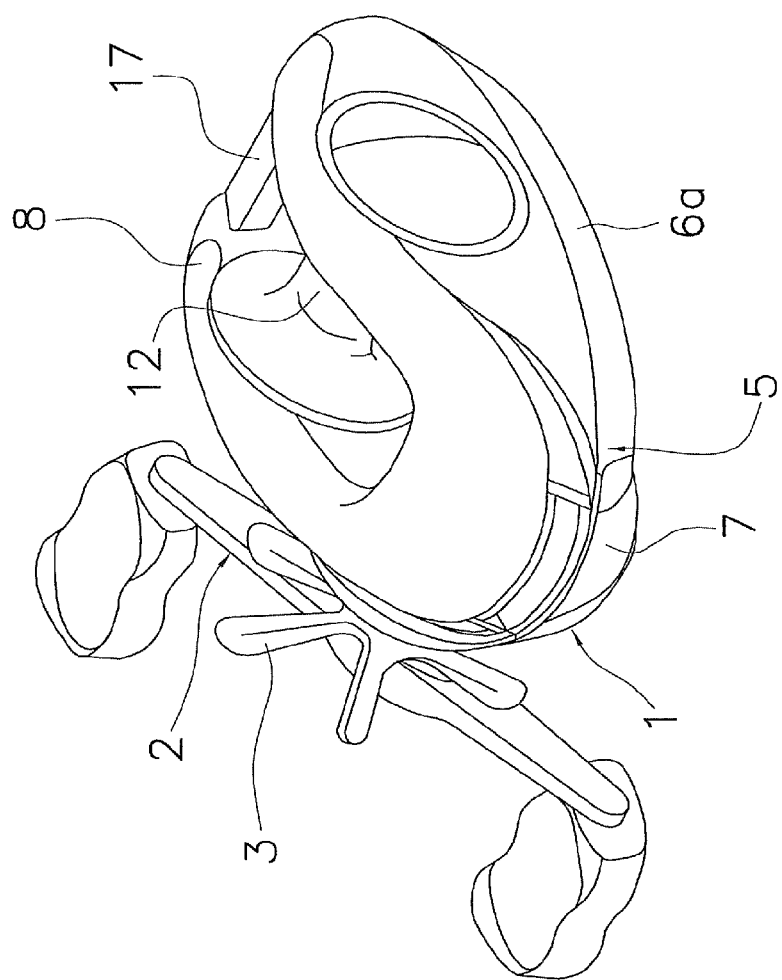
FIG. 1 is an oblique view of a dual-bearing reel that an embodiment of the present invention is adopted.

Referring initially to FIG. 1, a dual-bearing reel is illustrated in accordance with an embodiment of the present invention. The dual-bearing reel is a small low-profile baitcasting reel. The reel includes a reel body 1, a handle 2 and a star drag 3. The handle 2 is disposed lateral to the reel body 1 and is used for rotating a spool. The star drag 3 is disposed between the handle 2 and the reel body 1 and is used for regulating drag force.

Figure 2:
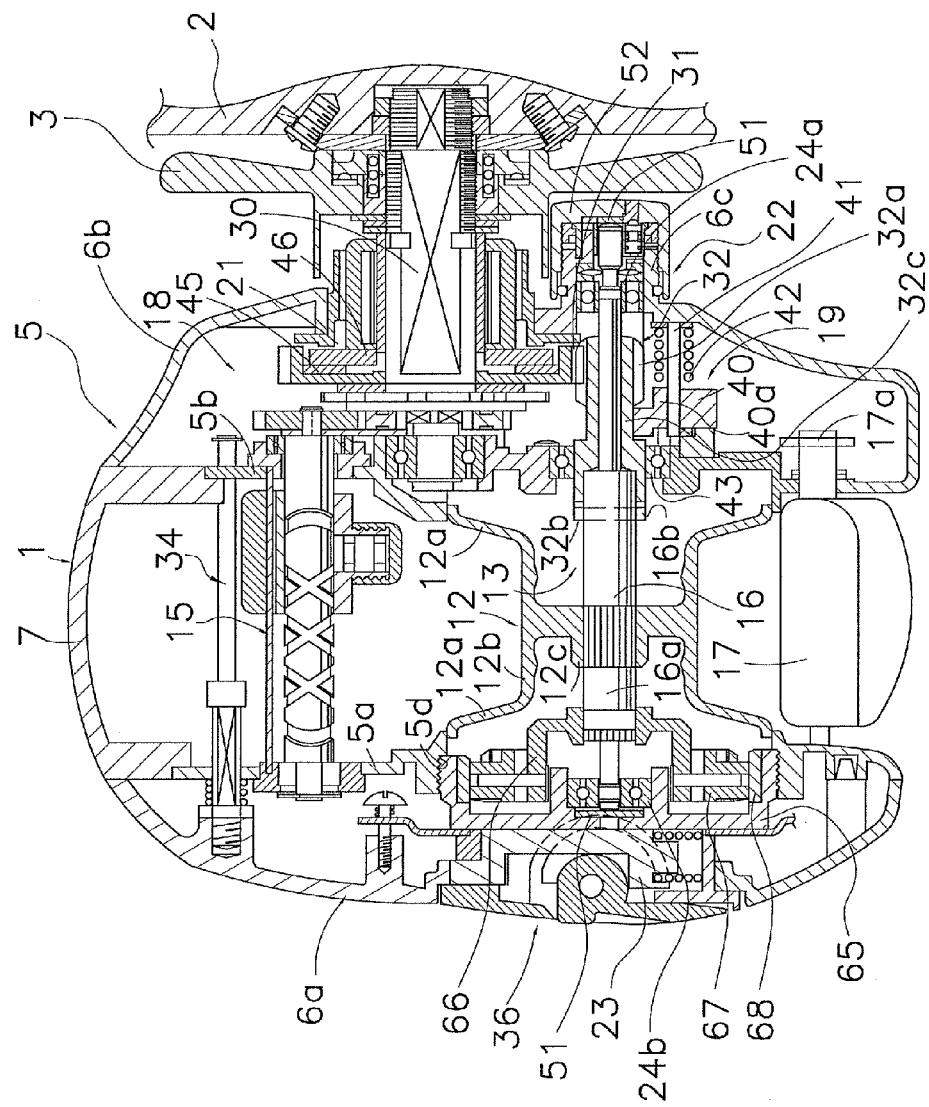
FIG. 2 is a cross-sectional view of the dual-bearing reel.

Referring now to FIG. 2, the reel body 1 includes a frame 5, a first side cover 6a and a second side cover 6b. The first and second side covers 6a, 6b are attached to both sides of the frame 5. As illustrated in FIG. 1, the reel body 1 further includes a front cover 7 and a thumb rest 8. The front cover 7 covers the front of the reel body 1, whereas the thumb rest 8 covers the top of the reel body 1. A rotatable spool 12 is used for winding a fishing reel. The spool 12 is removably attached to the interior of the reel body 1.

The frame 5 includes a pair of first and second side plates 5a, 5b and a plurality of coupling parts (not illustrated in the figures). The first and second side plates 5a, 5b are opposed to one another by a predetermined space. The coupling parts are used to couple the first and second side plates 5a, 5b.

The first side cover 6a is pivotally attached to the frame 5 for removing the spool 12 from the reel body 1. As illustrated in FIG. 2, the first side cover 6a includes a pivot mechanism 34 and a lock mechanism 36 to allow the first side cover to be swung opened or closed with respect to the frame 5. The pivot mechanism 34 supports the first side cover 6a in a front part of the frame 5. The first side cover 6a can thereby pivot and move in a direction away from the frame 5. The lock mechanism 36 is used to lock and/or unlock the first side cover 6a to the frame 5.

As illustrated in FIG. 2, the frame 5 accommodates the spool 12, a level winding mechanism 15 and a clutch lever 17. The spool 12 is disposed perpendicular to a fishing rod. The level winding mechanism 15 uniformly winds the fishing line onto the spool 12. The clutch lever 17 is a pad for the angler's thumb. The spool 12 can pass through an opening 5d of the first side plate 5a. Additionally, a gear mechanism 18, a clutch mechanism 13, a clutch engagement/disengagement mechanism 19, a drag mechanism 21 and a casting control mechanism 22 are disposed between the frame 5 and the second side cover 6b. The gear mechanism 18 transmits rotational force of the handle 2 to the spool 12 and the level winding mechanism 15. The clutch engagement/disengagement mechanism 19 executes control and engagement/disengagement of the clutch mechanism 13 in response to a handling of the clutch lever 17. The casting control mechanism 22 regulates resistance force to be generated in the rotation of the spool 12. Additionally, a centrifugal brake mechanism 23 is disposed between the frame 5 and the first side cover 6a. The centrifugal brake mechanism 23 reduces backlash during casting.

Figure 3:
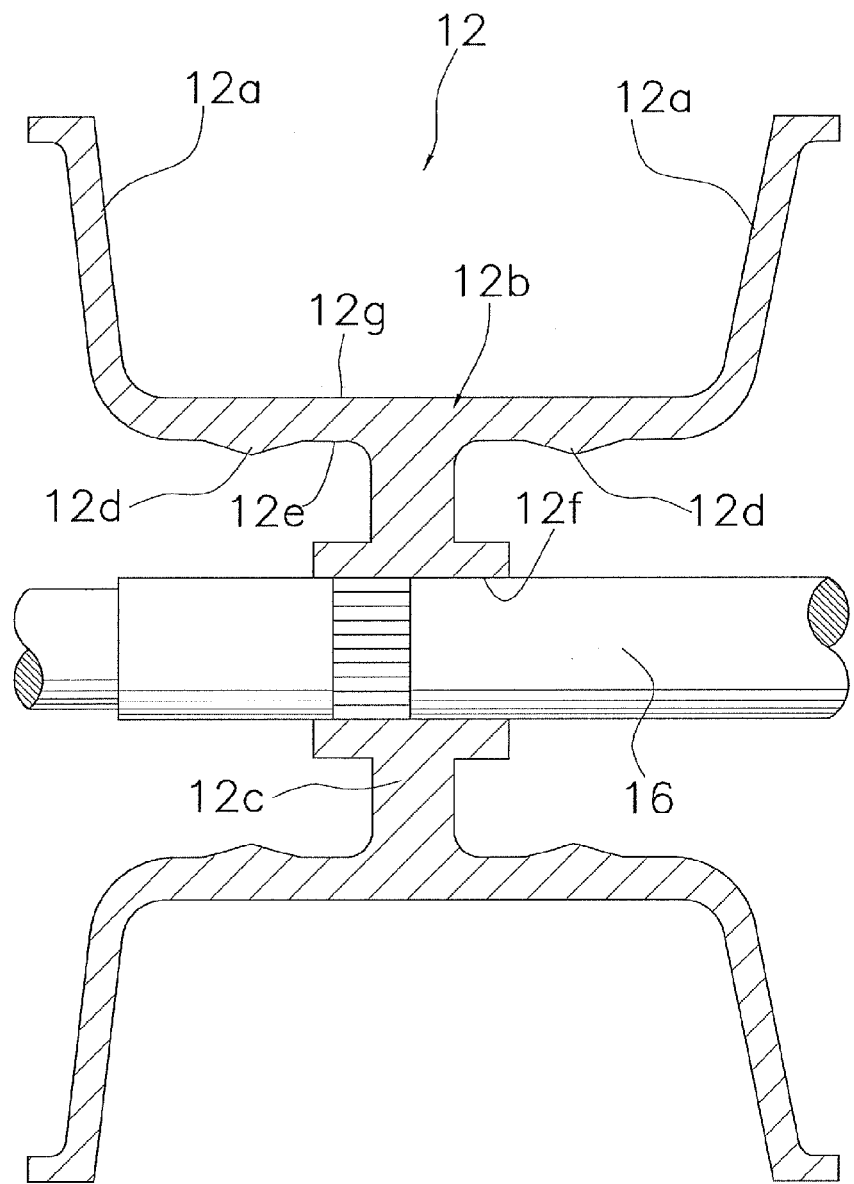
FIG. 3 is an enlarged cross-sectional view of a spool.

Referring now to the enlarged view of FIG. 3, the spool 12 includes a bobbin trunk 12b, a pair of flanges 12a, a boss 12c and thickened wall portions 12d. The bobbin trunk 12b is a tubular member. The fishing line is wound around the peripheral surface of the bobbin trunk 12b. The flanges 12a are integrally formed with the peripheral surface of the bobbin trunk 12b as a one-piece, unitary member. Each of the flanges 12a protrudes in the radial direction. The boss 12c is disposed centrally between axial ends of the bobbin trunk 12b and extends along the radial direction. The boss 12c is integrally formed with the flanges 12a and the peripheral surface of the bobbin trunk 12b as a one-piece, unitary member. The boss 12c is disc shaped with a through-hole 12f for receiving the spool shaft 16. The thickened wall portions 12d are formed on the inner side 12e of the peripheral surface of the bobbin trunk 12b. Each thickened wall portion 12d is formed between the flange 12a and an axial center part of the bobbin trunk 12b. The thickness of each thickened wall portions 12d is greater than the thickness of other wall portions of the bobbin trunk 12b. The flanges 12a, the bobbin trunk 12b, the boss 12c and the thickened wall portions 12d are integrally formed as a one-piece, unitary member by cutting a base material made of magnesium alloy. However, it should be understood that the flanges 12a, the bobbin trunk 12b, the boss 12c and the thickened wall portions 12d could be integrally formed as a one-piece, unitary member, using other materials and conventionally known mechanical processes such as die casting.

As illustrated in FIG. 3, the bobbin trunk 12b is a tubular member constructed to wind a fishing line around its peripheral surface. Each of the flange 12a has a substantially disc shape and is integrally formed with the axial ends of the bobbin trunk 12b. The flanges 12a are constructed to extend substantially in the radial direction of the spool 12. The boss 12c has a substantially disc shape with a through-hole 12f and is integrally formed with the axial center part of the peripheral surface of the bobbin trunk 12b. The spool shaft 16 is constructed to fit through the through-hole 12f so as to be non-rotatably attached to the boss 12c. The outer surface of the spool shaft 16 is serrated so that when the spool shaft 16 passes through the through-hole 12f of the boss 12c the spool shaft 16 is press-fitted to the boss 12c. However, it should be understood that other conventionally known techniques can be used to assemble the spool shaft 16 and the boss 12c.

As illustrated in FIG. 3, each thickened wall portions 12d is integrally formed between the flange 12a and the axial center part of the bobbin trunk 12b. The thickened wall portions 12d are symmetrically disposed on opposing sides of the axial center part of the bobbin trunk 12b. The thickened wall portions 12d are annularly formed along the circumferential direction of the inner side 12e of the peripheral surface of the bobbin trunk 12b and protrude in the radially inward direction. More specifically, the thickened wall portions 12d have a substantially cone shape. In other words, the thickness of the thickened wall portions 12d gradually changes. Therefore, the thickness of the thickened wall portions 12d is greater than other wall portions of the bobbin trunk 12b by the amount substantially corresponding to the shape of a cone.

As illustrated in FIG. 2, the spool shaft 16 passes through the second side plate 5b and extends to the outside of the second side cover 6b. The extending end of the spool shaft 16 is rotatably supported by a boss 6c formed in the second side cover 6b through a bearing 24a. On the other hand, the other end of the spool shaft 16 is rotatably supported in the interior of the centrifugal brake mechanism 23 through a bearing 24b. The bearings 24a, 24b are sealed ball bearings.

A right end of a large-diameter portion 16a of the spool shaft 16 is disposed in a penetration portion of the second side plate 5b. An engagement pin 16b, forming a part of the clutch mechanism 13, is fixed to the right end of the large-diameter portion 16a. The engagement pin 16b penetrates the large-diameter portion 16a along its diameter. The both ends of the engagement pin 16b protrude from the large-diameter portion 16a in a radial-outward direction.

The gear mechanism 18 includes a handle shaft 30, a main gear 31 and a pinion gear 32. The main gear 31 is fixed to the handle shaft 30. The pinion gear 32 is a tubular member meshing with the main gear 31. To lower the height of the thumb rest 8, the vertical position of the handle shaft 30 of the gear mechanism 18 is herein lower than that of the conventional one. With the configuration, lower portions of the second side plate 5b and the second side cover 6b, accommodating the gear mechanism 18, are positioned lower than those of the first side plate 5a and the first side cover 6a.

As illustrated in FIG. 2, the pinion gear 32 is a tubular member inwardly extending from the outside of the second side plate 5b. The spool shaft 16 penetrates the center of the pinion gear 32. The pinion gear 32 is attached onto the spool shaft 16 while being capable of moving in the axial direction. The left end of the pinion gear 32 in FIG. 2 is rotatably supported by the second side plate 5b through a bearing 43 while being capable of moving in the axial direction. The bearing 43 is also a sealed ball bearing.

The pinion gear 32 includes a teeth portion 32a, an engagement portion 32b and a narrowed portion 32c. The teeth portion 32a is formed on the outer periphery of the right end of the pinion gear 32 in FIG. 2. The teeth portion 32a meshes with the main gear 31. The engagement portion 32b is formed in the other end of the pinion gear 32. The narrowed portion 32c is formed in an intermediate part of the pinion gear 32 between the teeth portion 32a and the engagement portion 32b. The engagement portion 32b is made up of a concave groove formed on the end face of the pinion gear 32 along its diameter. The engagement pin 16b, fixed to the spool shaft 16 while penetrating it, is interlocked with the groove. In this case, when the pinion gear 32 moves to the outward and the engagement pin 16b of the spool shaft 16 is disengaged from the engagement portion 32b, rotational force of the handle shaft 30 is not transmitted to the spool 12. The clutch mechanism 13 is composed of the engagement portion 32b and the engagement pin 16b. When the engagement pin 16b is interlocked with the engagement portion 32b, torque is directly transmitted to the spool shaft 16 from the pinion gear 32 having diameter greater than that of the spool shaft 16. Therefore, torsional deformation is reduced and transmission efficiency of torque will be enhanced.

As illustrated in FIG. 2, the clutch lever 17 is disposed in a rear part of an interposed area between the pair of the first and second side plates 5a, 5b. More specifically, the clutch lever 17 is disposed behind the spool 12.

As illustrated in FIG. 2, the clutch engagement/disengagement mechanism 19 includes a clutch yoke 40. The clutch yoke 40 is disposed on the outer peripheral side of the spool shaft 16. The clutch yoke 40 is supported by two pins 41 (note either of the pins 41 is illustrated in the figure) while being capable of moving in parallel to the axis of the spool shaft 16. Additionally, the clutch yoke 40 includes an engagement portion 40a in its center part. The engagement portion 40a is engaged with the narrowed portion 32c of the pinion gear 32. Furthermore, springs 42 are disposed on the outer peripheral side of the respective pins 41 supporting the clutch yoke 40. Also, the springs 42 are disposed between the clutch yoke 40 and the second side cover 6b. The clutch yoke 40 is always inwardly urged by the springs 42.

With the configuration, the pinion gear 32 is normally disposed in an inward clutch-engagement position. A clutch-on state is produced by interlocking between the engagement portion 32b and the engagement pin 16b of the spool shaft 16. On the other hand, when the pinion gear 32 is outwardly moved by the clutch yoke 40, interlocking between the engagement portion 32b and the engagement pin 16b is released. Accordingly, a clutch-off state is produced.

The drag mechanism 21 includes a drag plate 45 and a pressure plate 46. The drag plate 45 is pressed by the main gear 31. The pressure plate 46 presses the drag plate 45 toward the main gear 31 at predetermined force in conjunction with a rotational handling of the star drag 3.

The casting control mechanism 22 includes a pair of friction plates 51 and a brake cap 52. The friction plates 51 hold and press the both ends of the spool shaft 16. The brake cap 52 regulates force of the friction plates 51 that hold and press the spool shaft 16. The left side friction plate 51 is attached to the interior of a brake case 65.

As illustrated in FIG. 2, the centrifugal brake mechanism 23 includes a brake member 68, a rotation member 66 and six movement members 67. The brake member 68 is fixed to the brake case 65. The rotation member 66 is disposed on the inner peripheral side of the brake member 68 in a concentric fashion with it. The rotation member 66 is fixed onto the spool shaft 16. The movement members 67 are attached to the rotation member 66 while being capable of moving in a radial direction.

The brake member 68 is a semi-thick cylindrical member made of copper system alloy. The brake member 68 is fixed to the inner side of the peripheral surface of the brake case 65. The brake case 65 is a closed-end tubular member. The bearing 24b is disposed on the inner bottom of the brake case 65. The bearing 24b supports the spool shaft 16 in the inner side of the peripheral side of the brake case 65. Additionally the left side friction plate 51 of the casting control mechanism 22 is attached to the inner bottom of the brake case 65.

According to the dual-bearing reel of the aforementioned configuration, the spool 12 includes a pair of the thickened wall portions 12d integrally formed in a pair of the intermediate portions between the flanges 12a and the center part of the bobbin trunk 12b, respectively. Additionally, thickness of the respective thickened wall portions 12d is greater than that of the bobbin trunk 12b. In this case, strength of the respective thickened wall portions 12d is highly maintained, because the respective thickened wall portions 12d are integrally formed in the respective intermediate parts between the flanges 12a and the center part of the bobbin trunk 12b. Therefore, deformation of the bobbin trunk 12b, causing difficulty in its usage, can be prevented while rotation performance of the spool 12 can be highly maintained, even if large stress acts on the respective intermediate parts between the flanges 12a and the center part of the bobbin trunk 12b when cutting work is executed for the flanges 12a or the fishing line is wound around the spool 12.

According to the present invention, because each of the thickened wall portions are formed on the outer peripheral surface of the bobbin trunk between the flange 12a and the axial center part of the bobbin trunk 12b, and because the thickness of each thickened wall portions is greater than the thickness of other portions of the bobbin trunk 12b, deformation of the spool 12 is prevented yet rotational performance of the spool is maintained.

Other Example Embodiments (a) In the aforementioned embodiment, the present invention has been explained with an example of the small low-profile dual-bearing reel. However, the shape of the dual-bearing reel is not limited to the aforementioned embodiment. For example, the present invention is applicable to a large dual-bearing reel or a round dual-bearing reel.

(b) In the aforementioned embodiment, the flanges 12a, the bobbin trunk 12b, the boss 12c and the thickened wall portions 12d are formed using magnesium alloy. However, the present invention is not limited to the configuration. For example, the flanges 12a, the bobbin trunk 12b, the boss 12c and the thickened wall portions 12d may be formed using aluminum alloy.

Figure 4:
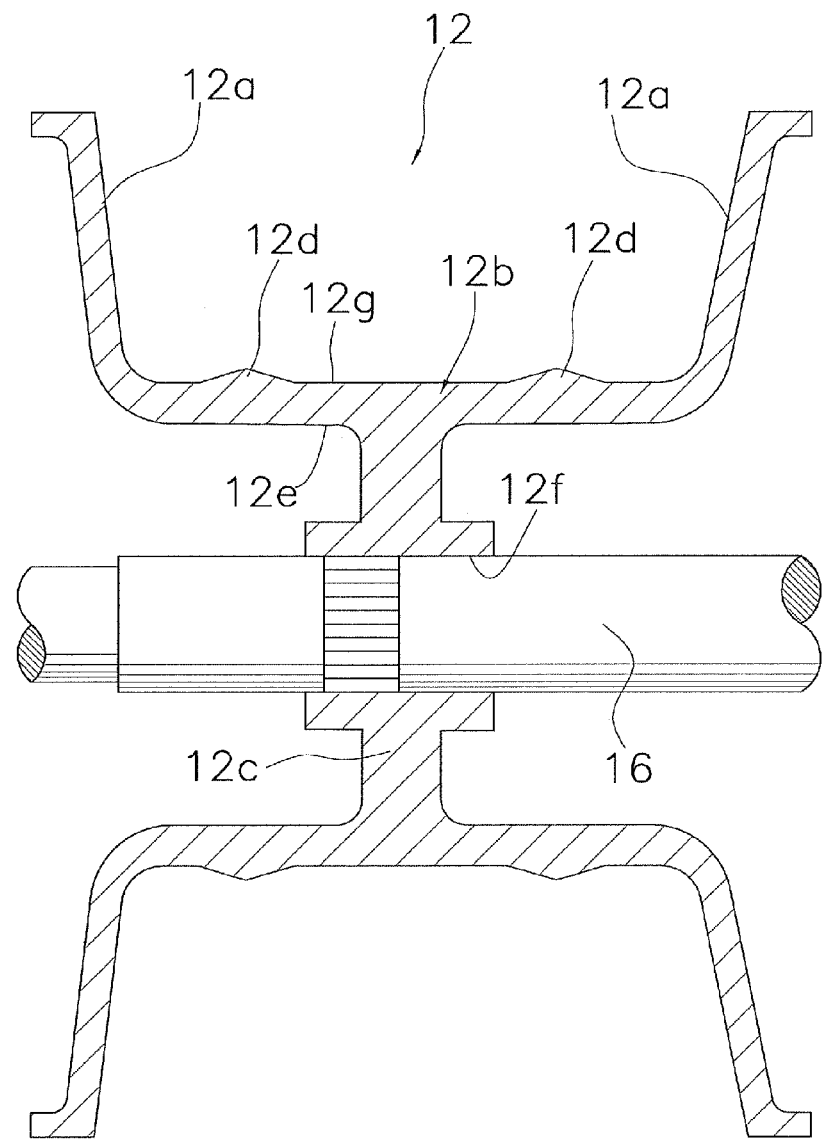
FIG. 4 is an enlarged cross-sectional view of a spool of other embodiment, corresponding to FIG. 3.
Figure 5:
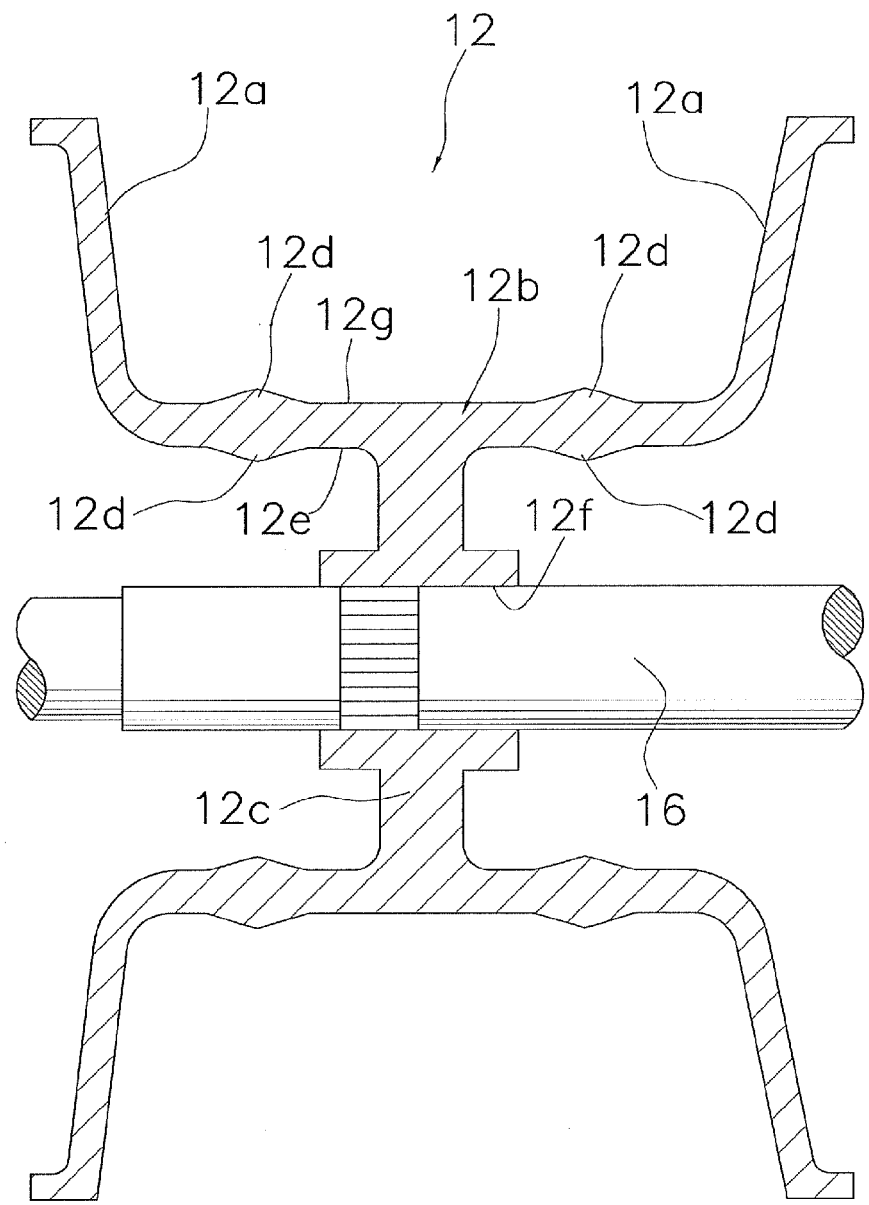
FIG. 5 is an enlarged cross-sectional view of a spool of other embodiment, corresponding to FIG. 3.

(c) In the aforementioned embodiment, the respective thickened wall portions 12d are formed on the inner side 12e of the peripheral surface of the bobbin trunk 12b and protrude in the radially inward direction. However, the thickened wall portions 12d can be formed on the outer side 12g of the peripheral surface of the bobbin trunk 12b and protrude in the radially outward direction, as illustrated in FIG. 4. Alternatively, the thickened wall portions 12d can be formed on both inner and outer sides 12e, 12g of the peripheral surface of the bobbin trunk 12b and protrude in both the radially inward and radially outward directions, respectively, as illustrated in FIG. 5.

Figure 6:
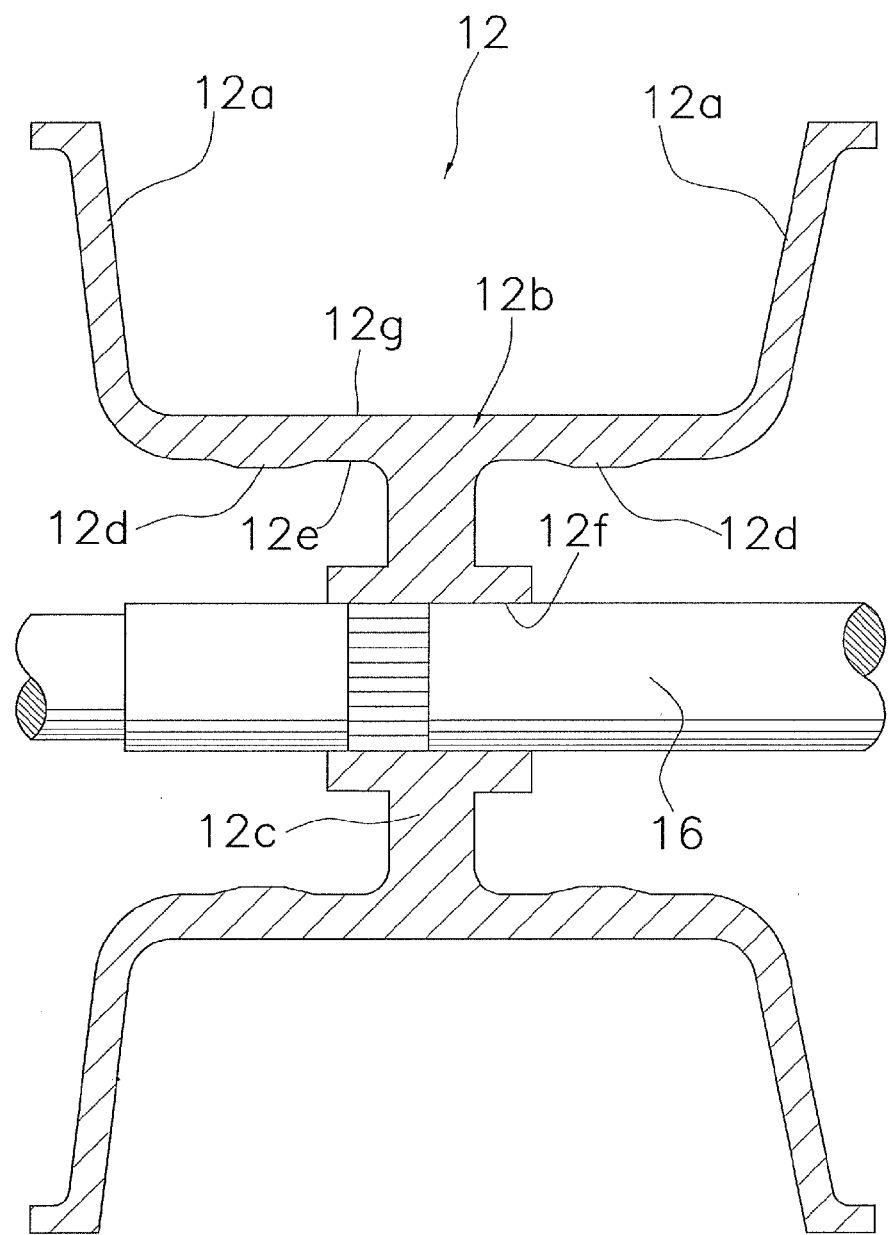
FIG. 6 is an enlarged cross-sectional view of a spool of other embodiment, corresponding to FIG. 3.
Figure 7:
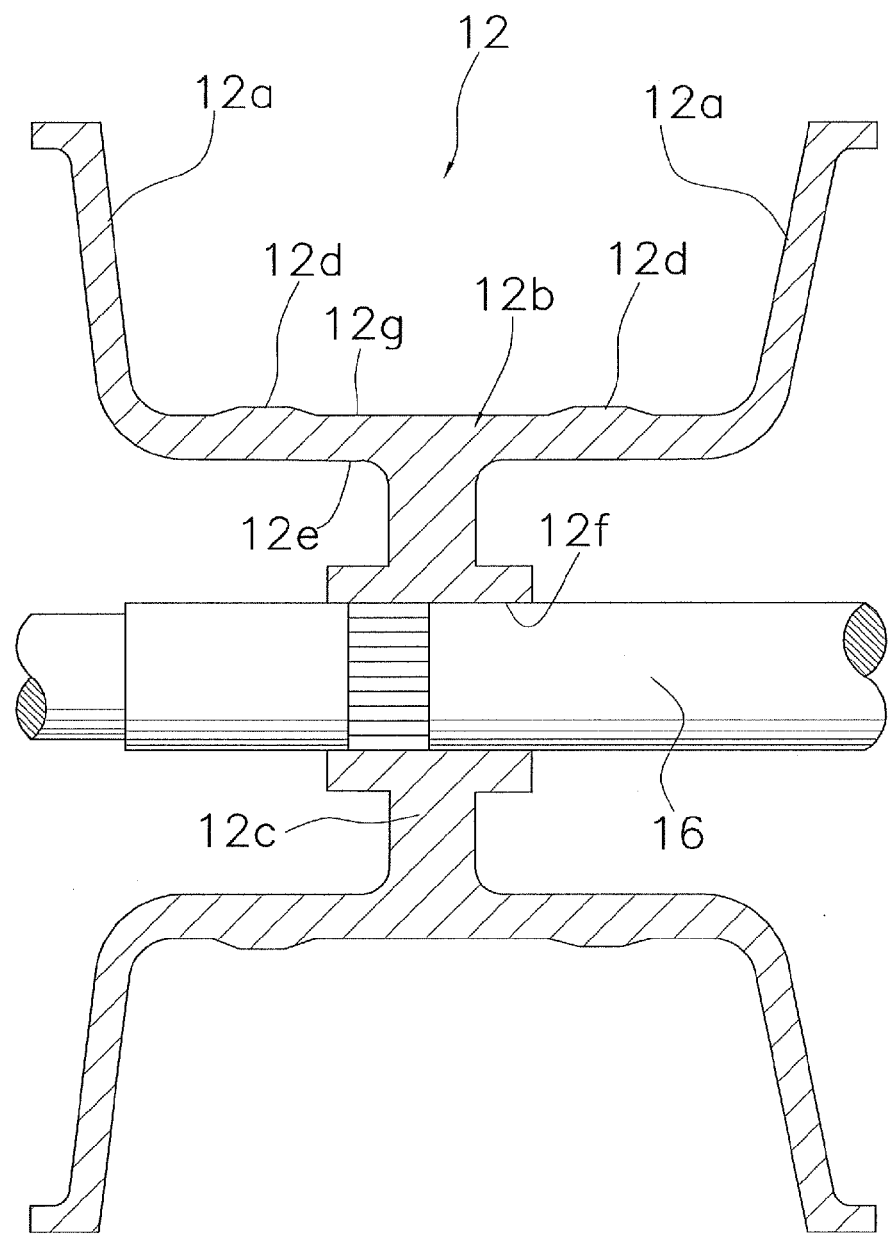
FIG. 7 is an enlarged cross-sectional view of a spool of other embodiment, corresponding to FIG. 3.
Figure 8:
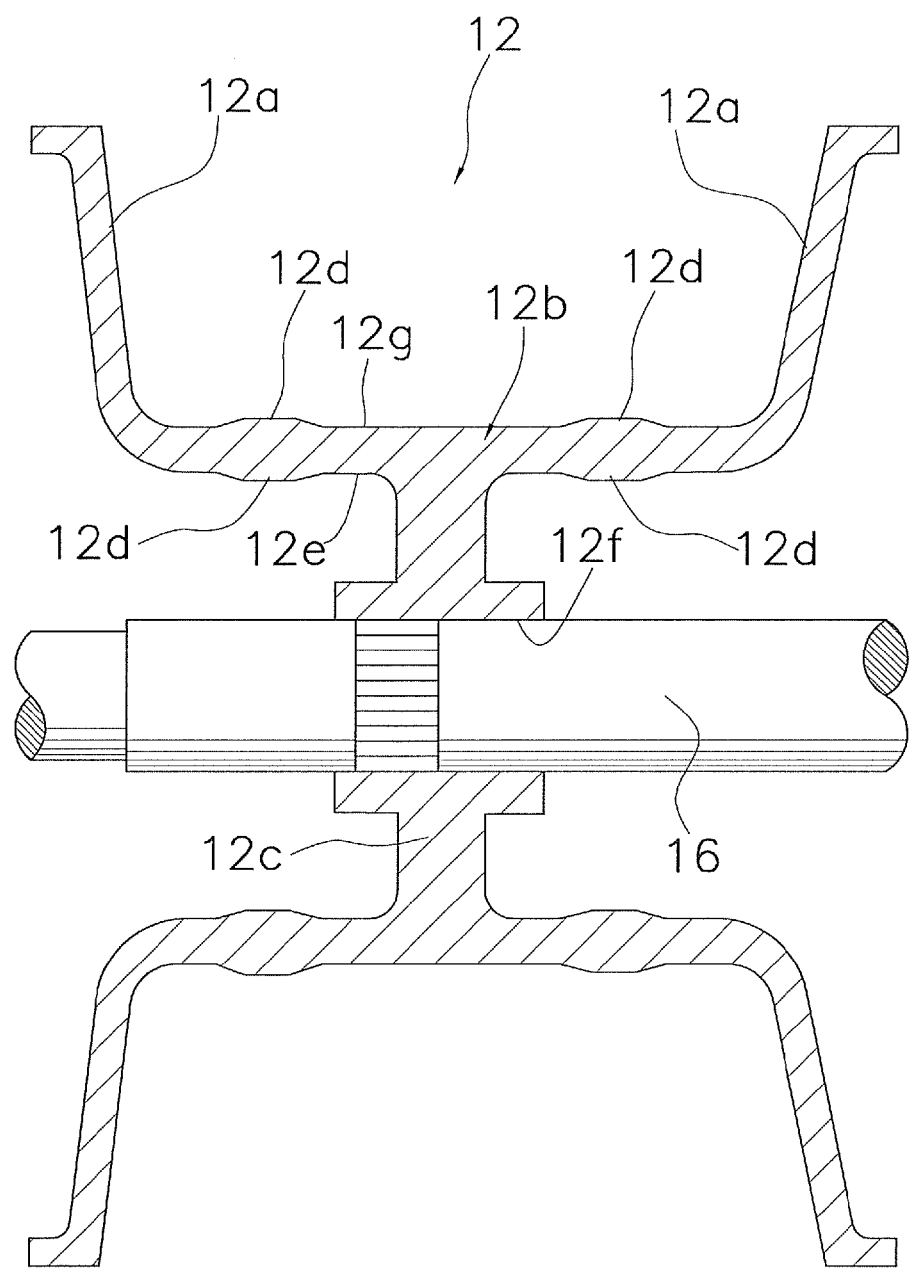
FIG. 8 is an enlarged cross-sectional view of a spool of other embodiment, corresponding to FIG. 3.

(d) In the aforementioned embodiment, the thickened wall portions 12d are formed having a substantially cone shape. However, the thickened wall portions 12d can be formed having a substantially trapezoid shape with a flat surface on its apex, as illustrated in FIGS. 6 to 8. Note that arrangement of the thickened wall portions 12d shown in FIGS. 6 to 8 correspond to those shown in FIGS. 3 to 5.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," "with" and their derivatives. Also, the term "part," "section," "portion," "member," or "element" when used in the singular can have the dual meaning of a single part or a plurality of parts.

As used herein, the following directional terms "inner" and "outer", "axial" and "radial" as well as any other similar directional terms refer to those directions of a device equipped with the present invention. Accordingly, these terms, as utilized to describe aspects of the present invention, should be interpreted relative to a device equipped with the present invention.

The term of degree "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool for a dual-bearing reel attached to a spool shaft supported by a reel body, the spool comprising:
   a tubular bobbin trunk with a peripheral surface extending along the axial direction of the spool to wind a fishing line around the bobbin trunk, the peripheral surface including thickness-strengthening wall portions;
   a pair of flanges integrally formed with the peripheral surface as a one-piece, unitary member, each of the flanges extending substantially in the radially outward direction of the spool;
   a boss member disposed between axial ends of the bobbin trunk and extending along the radial direction of the spool, the boss member including a disc portion with a through-hole to receive the spool shaft, one thickness-strengthening wall portion being formed along a center part of the bobbin trunk between one flange and the boss member and another thickness-strengthening wall portion being formed along a center part of the bobbin trunk between the other flange and the boss member,
   each of the thickness-strengthening wall portions having a thickness greater than the thickness of other portions of the bobbin trunk.

2. The spool according to claim 1, wherein
   the thickness-strengthening wall portions are formed on an inner side of the peripheral surface of the bobbin trunk and protrude in the radially inward direction of the spool.

3. The spool according to claim 1, wherein
   the thickness-strengthening wall portions are formed on an outer side of the peripheral surface of the bobbin trunk and protrude in the radially outward direction of the spool.

4. The spool according to claim 3, wherein
   the thickness-strengthening wall portions formed on an inner side of the peripheral surface of the bobbin trunk and protrude in the radially inward direction of the spool.

5. The spool according to claim 1, wherein
   each of the thickness-strengthening wall portions has a cross-sectional shape that is substantially triangular along the axial direction of the spool shaft.

6. The spool according to claim 1, wherein
   each of the thickness-strengthening wall portions has a cross-sectional shape that is substantially trapezoid along the axial direction of the spool shaft.

7. The spool according to claim 1, wherein
   the thickness-strengthening wall portions are symmetrically disposed on opposing sides of the axial center part of the bobbin trunk.

* * * * *